UNITED STATES PATENT OFFICE.

THOMAS MYERSON, OF LONDON, ENGLAND.

IMPROVEMENT IN PROCESSES OF TREATING BLOOD FOR THE MANUFACTURE OF MANURES.

Specification forming part of Letters Patent No. 163,099, dated May 11, 1875; application filed April 13, 1875.

*To all whom it may concern:*

Be it known that I, THOMAS MYERSON, of St. John's Street, Clerkenwell, London, in the county of Middlesex, England, have invented an Improved Process for Treating Blood for the Manufacture of Manure, of which the following is a specification:

This invention relates to an improved process of treating blood for the manufacture of manure.

In the preparation of manure from blood, as generally practiced, the blood has usually been simply dried by the natural heat of the same, or by artificial heat, without previous treatment. In either case partial decomposition ensues, resulting in the formation of ammonia, a valuable fertilizing agent, which escapes, detracting from the fertilizing qualities of the resultant manure.

Attempts have been made to arrest the decomposition of the blood during the process of drying by the use of antiseptic salts, such as sulphate of ammonia; but nothing has ever been done to arrest the ammonia formed during decomposition, which is the object of my invention.

For this purpose I combine with the blood a salt of alumina—preferably the sulphate or double sulphate of alumina and ammonia—taking advantage of the well-known properties of the alumina salts for combining with and holding free ammonia. By this means I obtain a compound in which all of the ammonia resulting from any decomposition of the blood during the process of the manufacture of the manure is held and retained in combination with sulphuric acid and ammonia.

In carrying out my invention I take the blood fresh from the animal and mix with it about four per cent. of sulphate of alumina, or the double sulphate of alumina, and soda or potash. At the expiration of twelve or twenty-four hours I add another two per cent. of the same, and in about six hours after about one per cent. more. The blood is then ready to be dried by natural or artificial heat in the usual manner. I prefer, however, to spread it thinly on wire or perforated shelves, so as to allow the air to pass freely through it and facilitate its drying.

Having thus described my invention, what I claim, and desire to secure by Letters Patent, is—

The process herein described of treating blood for the preparation of manure with a salt of alumina, for the purpose of retaining the ammonia, for the purpose set forth.

THOMAS MYERSON.

Witnesses:
  ALEXR. BROWNE,
  W. H. BURRELL,
    5 *Southampton Buildings,*
      *Holborn, London, W. C.*